United States Patent [19]
Rushworth

[11] Patent Number: 5,856,984
[45] Date of Patent: Jan. 5, 1999

[54] METHOD OF AND SYSTEM FOR GENERATING TEST CASES

[75] Inventor: John B. Rushworth, Plano, Tex.

[73] Assignee: MCI WorldCom, Inc., Ga.

[21] Appl. No.: 722,404

[22] Filed: Sep. 30, 1996

[51] Int. Cl.$^6$ .................................................. G06F 11/00
[52] U.S. Cl. ............................................................ 371/22.1
[58] Field of Search ....................... 371/22.1; 398/183.01, 398/183.02, 183.04, 183.13, 183.14

[56] References Cited

U.S. PATENT DOCUMENTS

| | | | |
|---|---|---|---|
| 5,418,888 | 5/1995 | Alden ......................................... | 395/64 |
| 5,699,402 | 12/1997 | Bauer et al. .............................. | 379/26 |

Primary Examiner—Vincent P. Canney

[57] ABSTRACT

A method of and system for creating telecommunication system test cases. The system includes a first user interface for the input of test case information for the creation of at least partially complete test case outlines. The test case outlines are stored in a test case outline storage. A lab data database contains laboratory data. The system includes a process for searching the database of laboratory data and creating completed test case outlines from partially completed test case outlines. A rules database contains rules for generating test case output data from test case outlines. The system includes a process for applying rules from the rules database to test case outlines to generate test case output data.

22 Claims, 11 Drawing Sheets

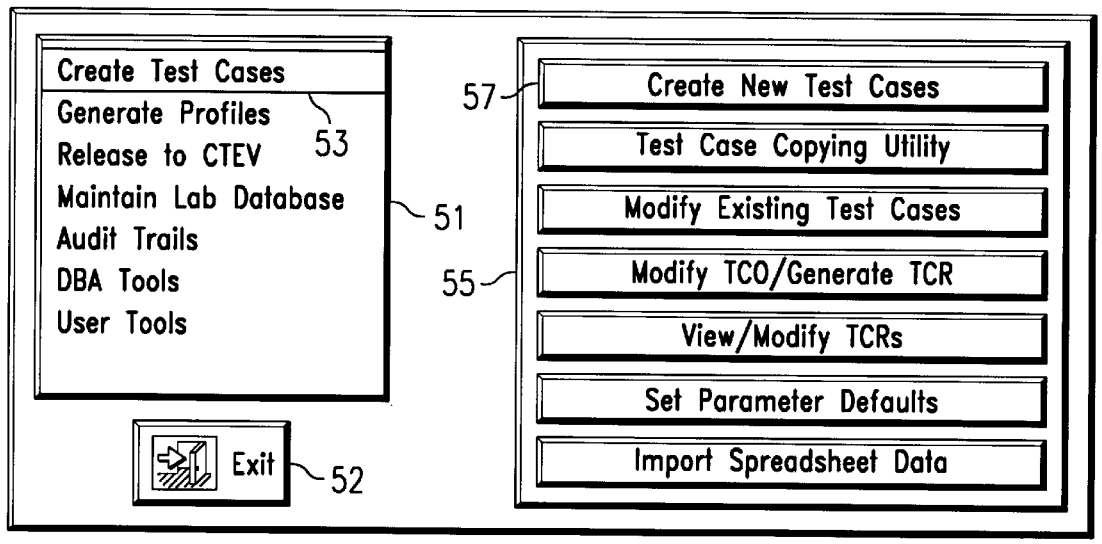

FIG. 4

Test Case Design (Page 2 of 8)

Trunks Configuration

- OSID: ☐
- OTC: ☐
- Vnet Orig: ☐▼
- Satellite Orig: ☐▼
- Orig Signalling: ☐▼
- Orig Protocol: ☐▼
- Orig Trunk Grp #: ☐
- Logical OSID: ☐
- Logical OTG: ☐
- Inter Trunk Class: ☐
- Satellite Inter: ☐▼
- Inter Trunk Grp #: ☐
- Carrier Number: ☐

- TSID: ☐
- Term Trunk Class: ☐
- Vnet Term: ☐▼
- Satellite Term: ☐▼
- Term Signalling: ☐▼
- Term Protocol: ☐▼
- Term Trunk Grp #: ☐

[ Help ]
[ ⇐ Previous ]
[ Next ]

- Create Test Cases
- Generate Profiles — 73
- Release to CTEV
- Maintain Lab Database — 51
- Audit Trails
- DBA Tools
- User Tools

[ Exit ] — 52

[ Update/View Lab DB Tables ]
[ View/Print Lab DB Reports ]
[ Execute Lab DB Queries ]

55

50

METHOD OF AND SYSTEM FOR GENERATING TEST CASES

FIELD OF THE INVENTION

The present invention relates generally to systems for developing test cases used for testing the call processing of a telecommunication service. More particularly, the present invention relates to an expert system for automating several repetitive, but technically complex, test development tasks. The present invention allows different individuals with knowledge in specific areas of call processing to maintain databases or rules that the system uses to assist other individuals to develop a complete test case.

DESCRIPTION OF THE PRIOR ART

The development of a call processing test case includes several general concepts. Some of the concepts overlap for certain product features, but they describe in broad terms the scope of the test case development process. In order to write test cases, a test case author must have a command of all concepts.

One concept is network topology, which means the telecommunication network elements required for the test, with their configuration and interconnections. The network elements may be real, or simulated within a lab environment.

Another factor to be considered in the design of test cases is customer characteristics, which includes the variations of customer profiles as they pertain to telecommunication network element databases. Depending on the network element being tested, customer characteristics often define the features or products that a customer may use.

A test case author must be familiar with call flow, which includes the desired actions to be taken by the network elements to attempt completion of the call through the network. One example of call flow is the differentiation between domestic, international, and private dialing plans. Other examples include the use of advanced alternate routing schemes and the translation from the type of call that was dialed, to a different call type.

A test case author must also know any required actions and events outside those that are caused by the network elements acting in response to call characteristics. Examples include time changes and losses of connectivity.

Another design concept is any special signaling or other network element interactions, such as the specification of an optional or unusual signaling parameter. A test case may use a particular set of data that is available only to specific testing organizations or test environments. This supports a database assignment concept in use in the lab, to allow non-conflicting simultaneous test execution activities on the same lab test platforms.

The process of developing a test case for use in a lab environment usually considers all of the above concepts as discreet steps. Each of these steps requires detailed knowledge across many different areas, which is more than can be expected of a single test case author. Thus, a single test case author is required to enlist the support of numerous other personnel, and constantly refer to hardcopy documentation of existing lab resources.

SUMMARY OF THE INVENTION

The system of the present invention provides a user interface from which the test case author may specify characteristics of the test. The user interface of the system of the present invention allows a test case author to design test cases using different levels of detail in the different areas of telecommunications. Areas of telecommunications that pertain to the test being developed may be specified at great detail and variation, while only a high level specification is required in all other areas which, while required to execute the test, may not be important to the feature being tested.

The system contains, or has access, to databases containing information on data already contained in the lab's telecommunication network elements. The system is capable of selecting existing data that meets the characteristics defined by the test case author. The test case author has the capability to override the system's selections with alternate choices.

Should no existing data meet the needs of the test, new data may be assigned and entered. The new data could be supplied either by the test case author or by an individual or group solely responsible for this function. New data would then have to be built into the appropriate telecommunication network elements. While the system does not directly build the new database into the network elements, it does provide data documentation in hardcopy and softcopy formats.

The system produces the output needed to execute and validate results of testing. One of the goals of this system is to ensure that the multitude of methods used to execute and validate a given test case are all provided the same data, even though each may require a different format of that data. For example, a hardcopy document of the test case displays the same Calling Party Number as is provided to an automated call execution platform or a billing verification platform. Thus, for each test case, the system supports outputs in the form of hardcopy reports containing required test case information that may be used for manual execution, and test execution, billing verification, and outpulsed digit verification data for various automated test execution and verification platforms.

The production of these various outputs is determined by logic built into this system. Most of the logic is contained in rules engines, which use the requirements of the test case and the characteristics of the data used by the test case. Thus, separate people who have specific knowledge may maintain the rules associated with their area of expertise. This allows a much broader range of test case authors to create test cases without having to be knowledgeable in all areas of telecommunications. Additionally, rules may be updated as new telecommunication capabilities are developed. Should a future test case be designed which includes an existing network capability, the system is already aware of the impacts, and test case design is simplified.

BRIEF DESCRIPTION OF THE DRAWINGS

FIG. 2 is a pictorial view of the main menu of the present invention in the Create Test Cases mode.

FIG. 3 is a pictorial view of a first test case outline window of the present invention.

FIG. 4 is a pictorial view of a second test case outline window of the present invention.

FIG. 5 is a pictorial view of the main menu of the present invention in the Maintain Lab Database mode.

DESCRIPTION OF THE PREFERRED EMBODIMENT

Figure 1:
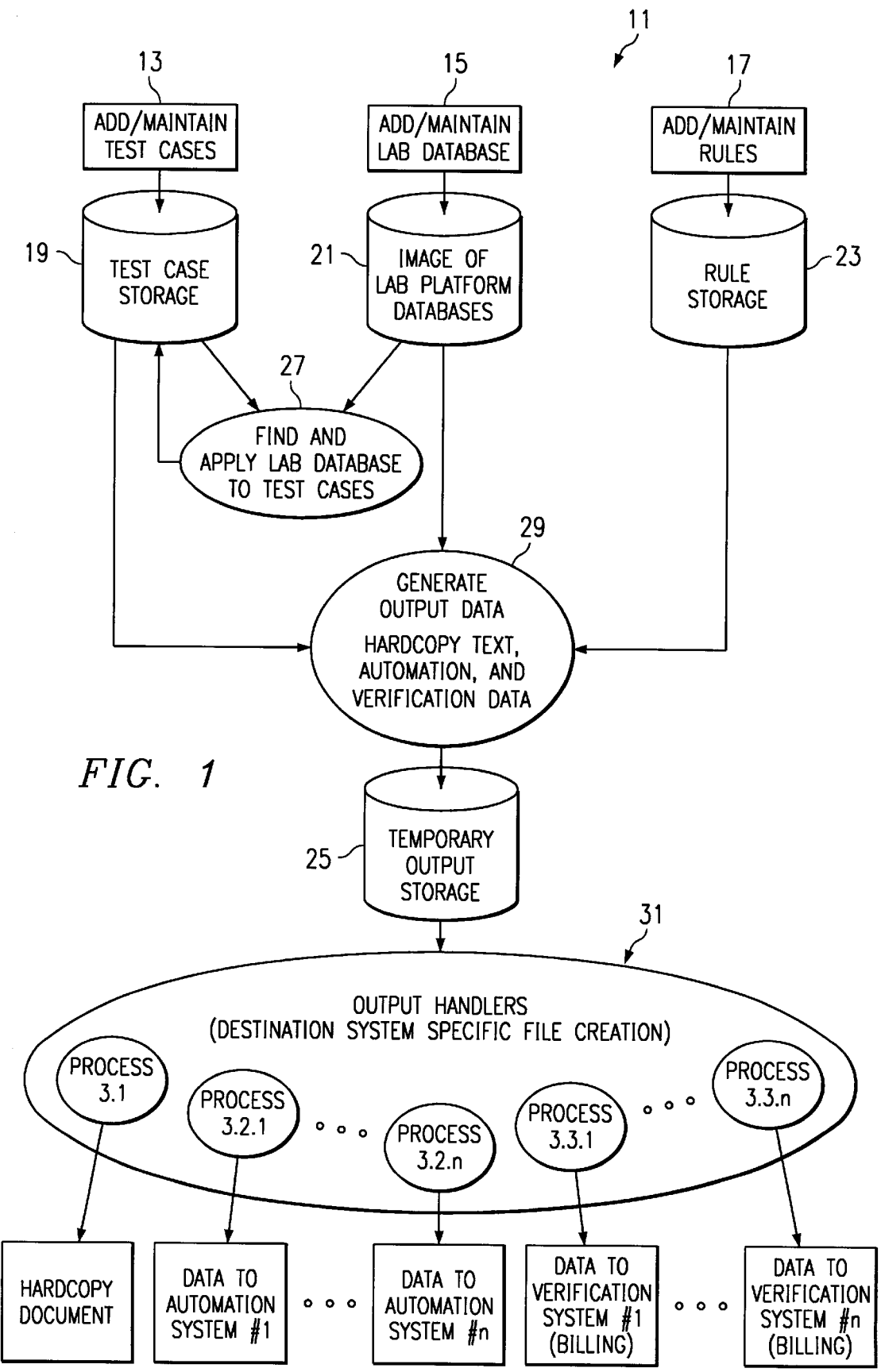
FIG. 1 is a high level block diagram of the architecture of the system of the present invention.

Referring now to the drawings, and first to FIG. 1, a system according to the present invention is designated generally by the numeral 11. In the preferred embodiment, system 11 is implemented in a network of personal computers including individual workstations operating in an environment that supports graphical user interfaces. System 11 includes user interfaces, databases, and processes that cooperate to enable users of various levels of expertise to generate telecommunications test cases. More specifically, System 11 includes a first user interface 13 by which a test case author may create and maintain test cases. As will be explained in detail, first user interface 13 allows a test case author to create and modify test case outlines and to initiate the various processes of the present invention.

System 11 additionally includes a second user interface 15 that is intended for use by lab platform database administrators, who may or may not be the same as the test case authors. Second user interface 15 allows lab platform database administrators to add, modify, and delete lab database information, and create reports that may be used to build and maintain the lab platform database.

System 11 finally includes a third user interface 17 that is intended for use by personnel with advanced knowledge of specific areas of call processing and the requirements of the systems that will receive output from system 11. While these persons may or may not be the same as the test case authors, it is most likely that different people, or groups, will be assigned specific rule maintenance responsibilities, based on the different types of output system 11 can produce. Third user interface 17 allows rule maintenance personnel to add, modify, and delete rule information, and to create reports to assist in maintaining the rules database.

In addition to the user interfaces, system 11 includes a first database 19, in which test case outlines are stored. Test case outlines specify the characteristics and requirements for test cases on the platform to be tested, including any database information that may be required. The test case outlines contain test case data, which is the actual lab platform database information used by each test case. The test case outlines also include administrative information, which is information required for tracking development status, change control, and other administrative uses.

System 11 further includes a second database 21, which contains a representation of the data contained in each of the lab platforms. This data is represented in formats useful to the creation of test cases and the management of the data in the lab platforms, but it is not necessarily an exact image of individual platform architecture or contents.

System 11 additionally includes a third database 23, which contains rules comprising knowledge of desired outputs from system 11, and how to provide the outputs based on information contained in first database 19.

System 11 finally includes a fourth database 25, which contains temporary output storage of data required by the persons and systems that will be receiving test case data from system 11. Fourth database 25 is provided so that an intermediate step may be taken in the test case development process, to allow review and modification of test cases prior to delivery to other systems.

System 11 includes a first process 27 that takes the test case outline data from first database 19, and searches second database 21 for lab platform data that satisfies the test case requirements. Unspecified requirements in the test case outline are allowed. Only test case requirements that were specified by the test case author will be used to select lab data. The data that first process 27 selects is stored back into first database 19 in the test case outline.

System 11 additionally includes a second process 29 that takes the test case outline and data from first database 19 and applies rules from third database 23. The output of third process 29 is the test case data that is required by any person or system that performs a test case. The output of second process 29 is stored in fourth database 25. Second process 29 performs the logical formatting of the output data by generating parameters needed for output, as well as data values meeting the requirements of the systems to receive the data, but not necessarily meeting the specific system interface format requirements.

System 11 finally includes output handlers that are generally referred to as third process 31. Third process 31 takes the data in fourth database 25 and creates the output format required by the system to receive the data. The output may be a hardcopy test case document formatted for a printer or file or an ASCII file with syntax specific to an automated system for test execution and billing verification.

Referring now to FIG. 2, the main menu of the present invention is designated generally by the numeral 50. Main menu 50 includes a mode selection list 51. Mode selection list 51 comprises a list of available modes in which the system of the present invention may operate. In FIG. 2, main menu 50 is in the Create Test Cases mode, as indicated at 53. Selection of a mode from mode selection list 51 brings up an action list 55, which comprises a listing of actions that are available in the mode.

Selection of an action from action list 55 will take the user to a screen from which the action may be invoked. For example, if the user wants to create a new test case, the user selects Create New Test Cases item 57 from action list 55. Selection of item 57 brings up a set of test case design screens, examples of which are illustrated in FIGS. 3 and 4.

Referring to FIG. 3, a first test case design screen is designated generally by the numeral 59. First test case design screen 59 includes a plurality of fields into which a test case author may enter information to create a test case outline. The fields of first test case design screen 59 deal mainly with identifying and comment information for the test case outline being created. For example, a field 61 is provided for identifying the test case by test case number, and a field 63 is provided so that the test case author can identify the purpose of the test case. Some of the fields of first test case design screen 59 include drop down lists that allow the test case author to select an entry.

First test case design screen 59 also includes push buttons that allow the test case author to navigate through the test case design screens and process the test case outline being created. Thus, First test case design screen 59 includes a Next push button 65, selection of which takes the test case author to the next test case design screen, which is illustrated in FIG. 4. First test case design screen 59 also includes a Clear All Fields push button 65, a Save this Record push button 67, and an Exit push button 69, the functions of which are well known to those familiar with graphical user interfaces.

Referring now to FIG. 4, there is shown a second test case design screen 71. Second test case design screen 71 is generally similar to first test case design screen 59, in that it includes fields into which a test case author may enter information from which a test case outline is created. Second test case design screen also includes a Previous push button 73 that allows the test case author to navigate back to first test case design screen 59. In the preferred embodiment, there are eight test case design screens, but for purposes of illustration only two are shown. By navigating through the test case design screens and filling in as many fields as the test case author wishes, the system of the present invention enables the test case author to create a test case outline.

Referring now to FIG. 5, main menu 50 is shown in the maintain lab database mode, as indicated by selection of item 73 from mode selection list 51. Selection of maintain lab database item 73 from mode selection list 51 bring up a list of available actions in action list 55. Thus, in maintain lab database mode, a user can update or view lab database tables, view or print lab database reports, and execute lab database queries.

Figure 6:
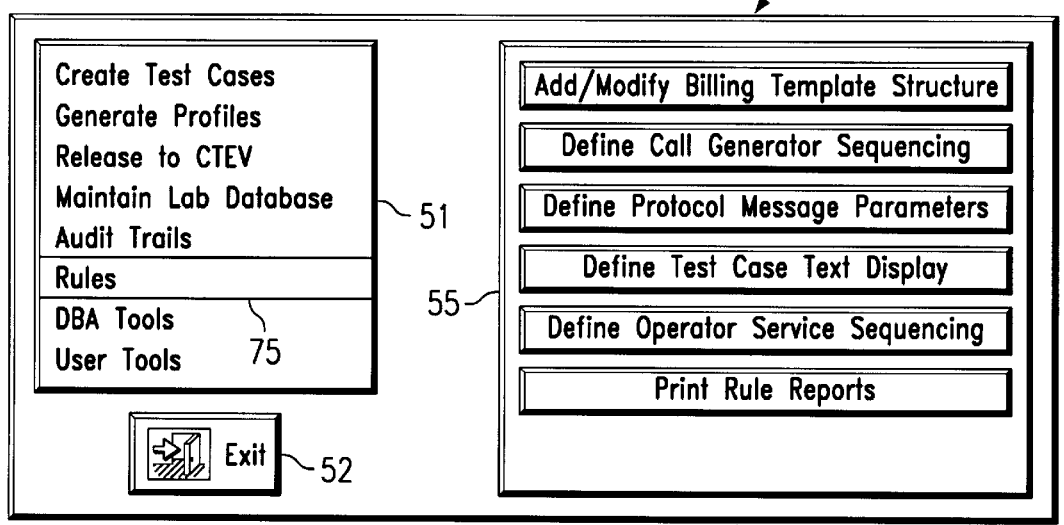
FIG. 6 is a pictorial view of the main menu of the present invention in the Maintain Rules mode.

Referring now to FIG. 6, main menu 50 is shown in the maintain rules mode, as indicated by selection of item 75 from mode selection list 51. Selection of maintain rules item 75 from mode selection list 51 bring up a list of available actions in action list 55. Thus, in maintain rules mode, a user define and update the rules that the system uses to generate the various test case outputs from the test case outlines created by a test case author.

Figure 7:
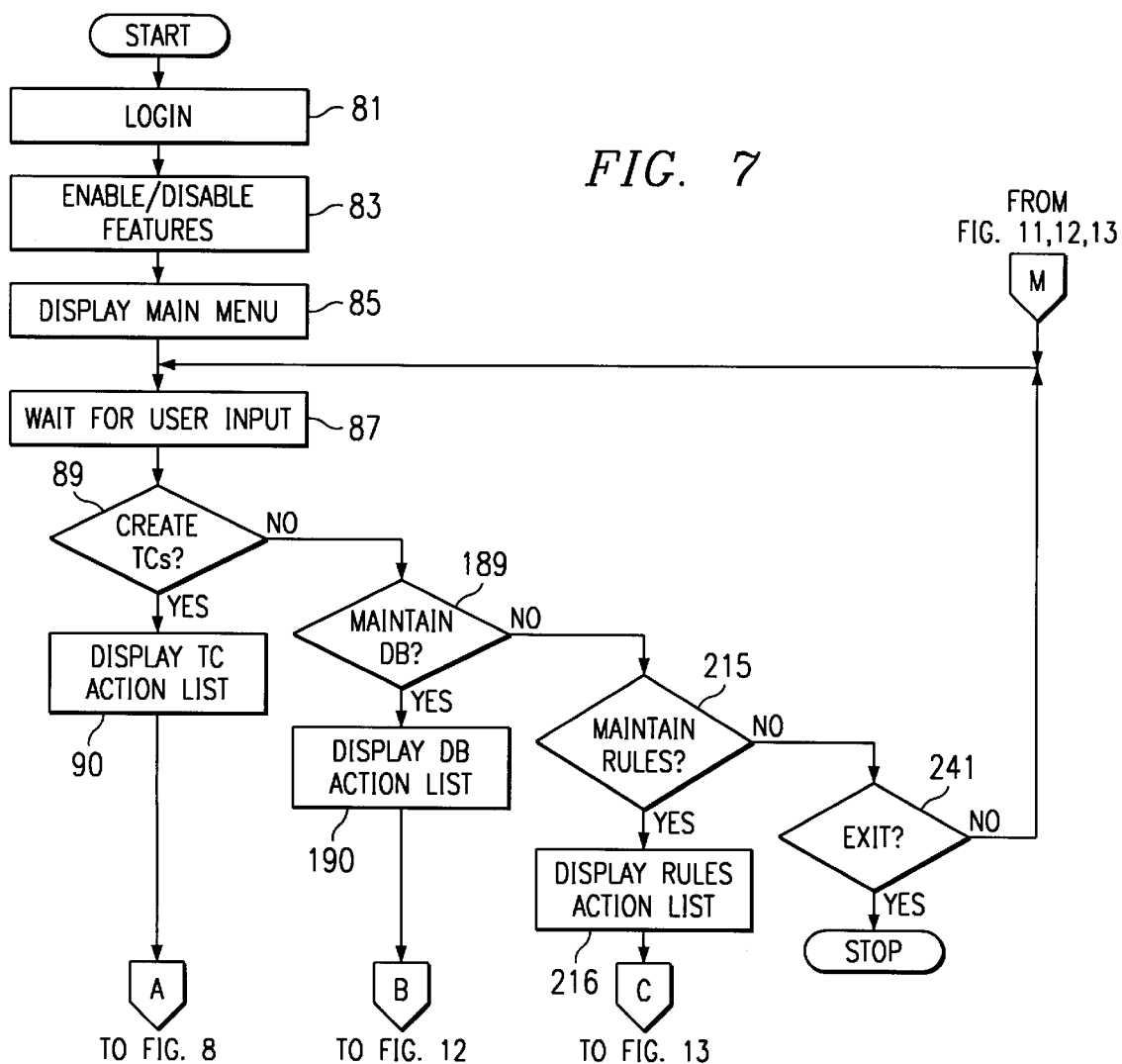
FIG. 7 is a high level flowchart of the overall logical flow of the present invention.

Referring now to FIG. 7, there is shown a chart of the overall logical flow of the present invention. In the preferred embodiment a login screen is provided at block 81. Login prompts the user to enter a user ID and a password. The system performs tests indicated generally at block 83 to enable or disable various features of the system based on the level of authorization of the particular user, and displays the main menu, at block 85. Then the system waits for user input at, block 87.

Figure 8A:
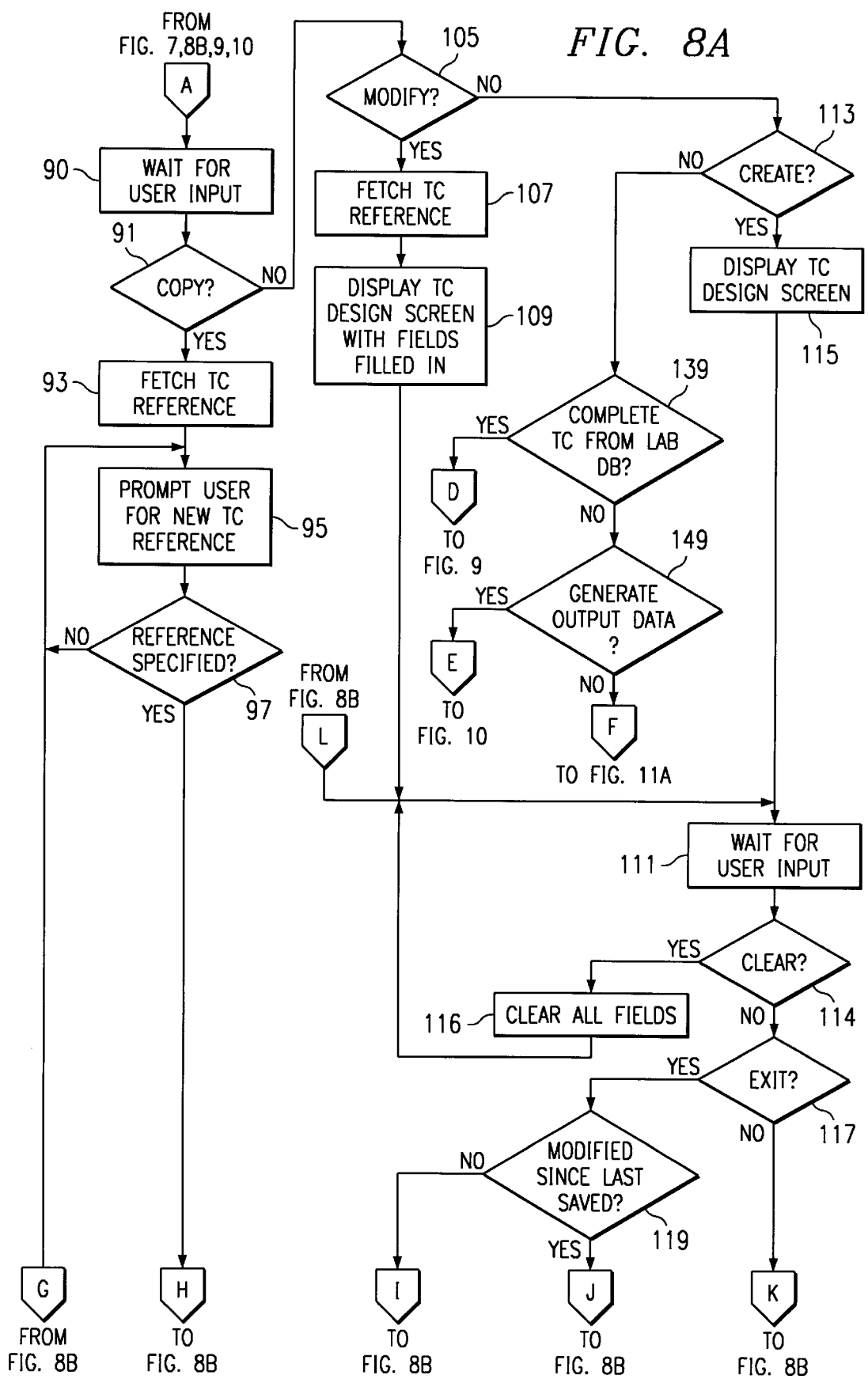
FIG. 8 is a flowchart of the create test cases routine of the present invention.
Figure 8B:
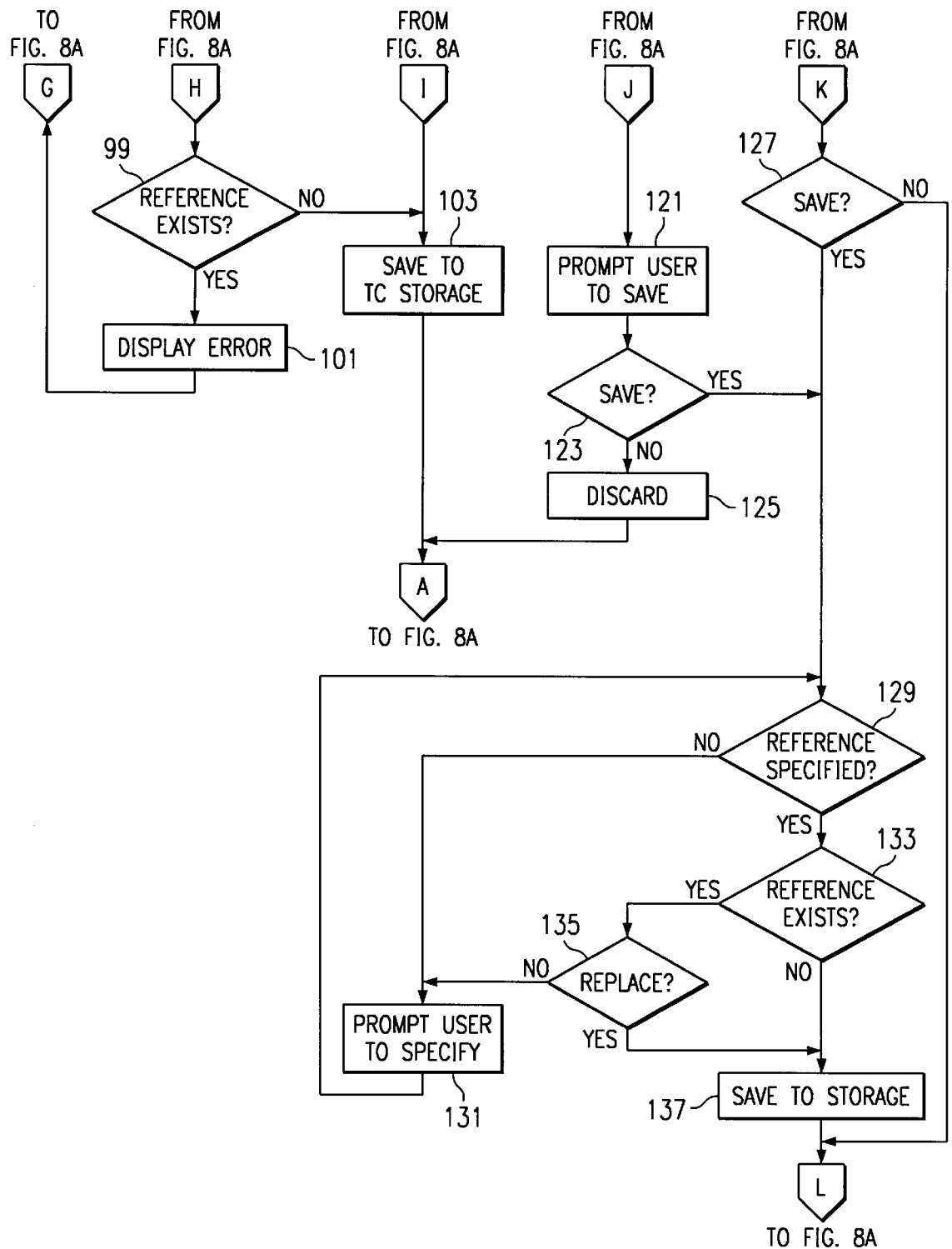

If the user selects create test cases mode, at decision block 89, the system displays the action list of FIG. 2 at block 90, and branches to the logic of the flow chart of FIG. 8. Referring now to FIG. 8, the system waits for user input at block 90. If the user chooses the copy utility, at decision block 91, the system prompts the user to identify a test case reference to be copied and fetches the identified test case outline reference at block 93. The system then prompts the test case author to specify a new test case outline reference for the copied test case outline, at block 95. After the test case author has specified a new test case outline reference, as indicated at decision block 97, the system tests whether or not the test case outline reference specified already exists, at decision block 99. If the specified reference already exits, the system displays an error message at block 101, and returns to block 95 to prompt the user to specify a new test case outline reference. If, at decision block 99, the reference does not already exist, the system saves the copied test case to storage at block 103 (test case storage database 19 of FIG. 1) and returns to block 90 to await further user input. The copy utility thus enables a test case author to use an exiting test case outline as the basis for creating a new test case.

If the test case author chooses to modify an existing test case outline, at decision block 105, the system prompts the user to identify the test case reference to be modified and fetches the identified test case outline reference at block 107. The system then displays test case design screens (examples of which are shown in FIGS. 3 and 4) with fields filled in with information from the test case outline reference, at block 109, and waits for user input, at block 111. By modifying a test case outline, a test case author can override system supplied values or change values previously entered by a test case author.

If the test case author chooses to create a new test case, at decision block 113, the system displays a test case design screen, with blank fields, at block 115, and waits for user input at block 111.

Continuing in FIG. 8, the system waits for user input at block 111. The test case author may fill in blank fields or write over previously filled in fields in the test case design screens. If the user chooses to clear all fields (by actuating push button 65 of FIG. 3), as indicated at decision block 114, the system clears all fields at block 116 and returns to block 111 to await further user input. If, at decision block 117, the user chooses to exit the test case design screens (by actuating push button 69 of FIG. 3), the system tests at decision block whether the test case outline has been saved since it was last modified. If not, the system saves the test case outline to storage at block 103 and returns to block 90 to await further user input. If, at decision block 119, the test case has been modified, the system prompts the user to save the test case outline at block 121. If, at decision block 123, the user chooses not to save the information entered into the test case design screens, the system discards the information at block 125 and returns to block 90 to await further user input.

Continuing with the flow from block 111, if, at decision block 127, the user chooses to save the information entered into the test case design screens, the system tests at decision block 129 whether or not a reference for the test case outline has been specified, as by entry of a test case number in field 61 of FIG. 3. If not, the system prompts the user to specify a test case reference at block 131. If a test case reference has been specified, the system tests at decision block 133 whether or not the test case reference already exists. If not, the system saves the work to storage, at block 137, and returns to block 111 to await further user input into the test case design screens. If the test case reference does exist already, the system queries the user, as generally indicated at decision block 135, whether the user desires to replace the already existing test case reference. If so, the system saves the work to storage under the pre-existing test case reference, at block 137, and returns to block 111. If the user does not want to replace the pre-existing test case reference, the system prompts the user to specify a new test case reference, at block 131.

Thus, the logic of FIG. 8 described so far enables a test case author at least partially to complete test case outlines by filling in the entry fields of test case design screens. The test case design screens are constructed to elicit test case information. A test case author can create a new test case outline from scratch, or by copying and modifying a pre-existing test case outline. A test case author can also modify or edit a pre-existing test case outline, by changing previously entered or system supplied values.

Figure 9:
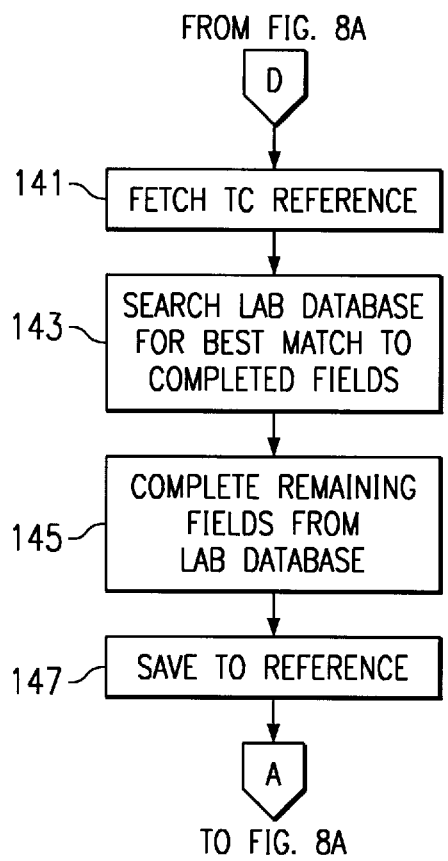
FIG. 9 is a flowchart of the complete test case from lab database routine of the present invention.

Continuing with the flow of FIG. 8, the system allows a test case author to complete a test case outline automatically (first process 27 of FIG. 1), as indicated at decision block 139. As shown in FIG. 9, the system fetches the test case outline reference at block 141. Then, the system searches the lab database for the best match to the completed fields in the test case outline, at block 143. When the system finds the best match, the system completes the remaining fields with data from the lab database, at block 145, and saves the completed test case outline to test case storage, at block 147. The system then returns to block 90 of FIG. 8 to await user input. The test case author can modify the system-supplied values by invoking the modify routine at decision block 105 of FIG. 8.

Figure 10:
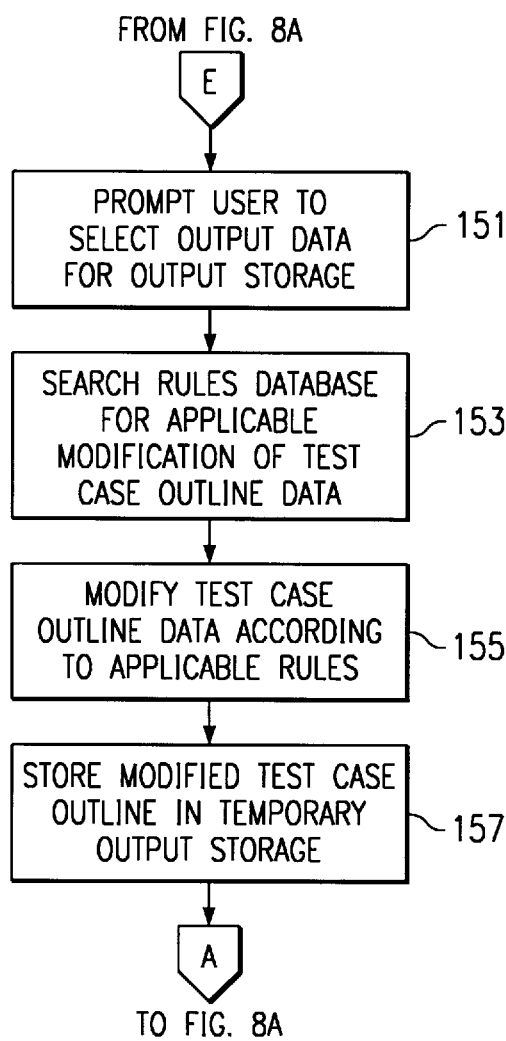
FIG. 10 is a flowchart of the generate output data routine of the present invention.

Referring again to FIG. 8, the system allows the test case author to generate output data (second process 29 of FIG. 1), as indicated at decision block 149. Referring to FIG. 10, the system prompts the user to select output data for output storage, at block 151. The system searches the rules database (rule storage 23 of FIG. 1) for applicable modifications of test case outline data necessary to create an output file, at block 153, and then modifies the test case outline data according to the applicable rules, at block 155. Then the system stores the modified test case outline in temporary output storage 25 of FIG. 1, as indicated at block 157, and then returns to block 90 of FIG. 8 to await user input.

Figure 11A:
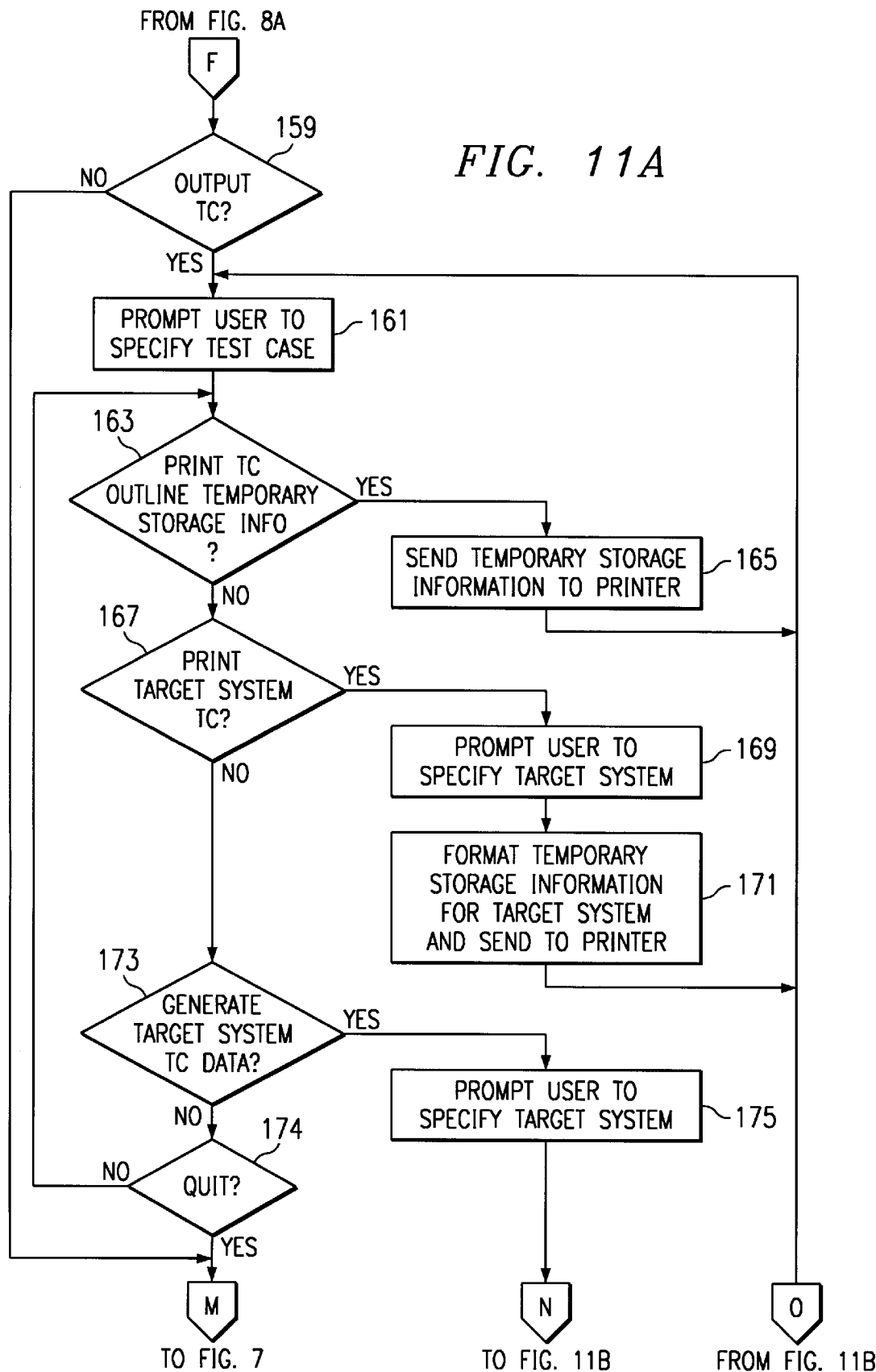
FIG. 11 is a flowchart of the output test case routine of the present invention.
Figure 11B:
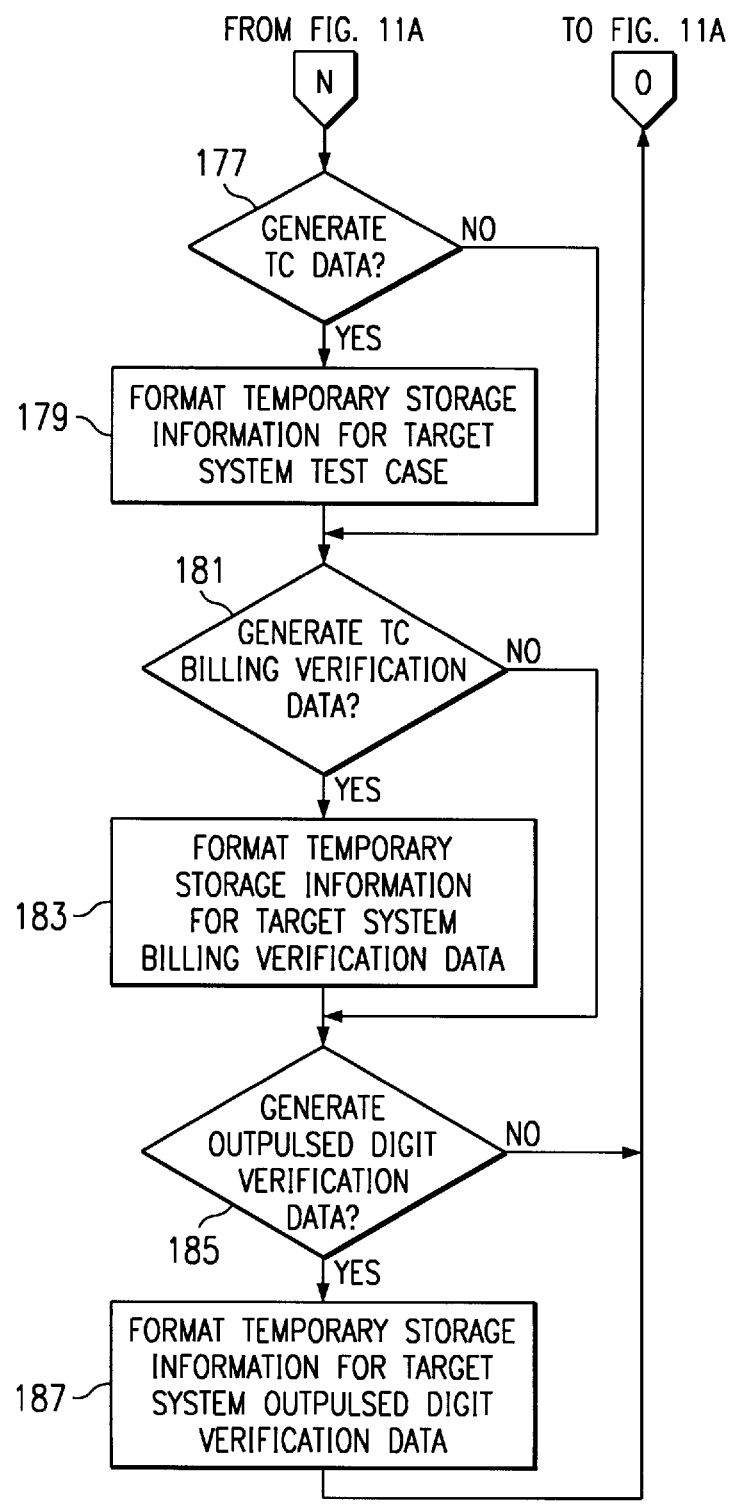

Finally, the user can launch the output handlers, which are generally referred to as third process 31 of FIG. 1. It will be recalled that third process 31 takes the data in temporary output storage 25 and creates the output format required by the system to receive the data. The output may be a hardcopy test case document formatted for a printer or file or an ASCII file with syntax specific to an automated system for test execution and billing verification. As shown in FIG. 11, when a user chooses to output a test case, at decision block 159, the system prompts the user to specify a test case in temporary storage, at block 161. The user then has various choices for the form of the output. As indicated at decision block 163, the user may cause the system to print the test case information stored in temporary output storage. In that case, the system simply sends the temporary storage information to a printer, at block 165, and returns to block 161.

Additionally, as indicated at decision block 167, the user may cause the system to print a target system test case. In that case, the system prompts the user to specify a target system, at block 169. A target system is an automated test execution or verification system. After the user has specified a target system, the system formats the temporary storage information for the target system and sends the formatted information to a printer, at block 171. Then, the system returns to block 161.

Finally, the user can cause the system to generate target system test case data, as indicated at decision block 173. The system prompts the user to specify a target system, at block 175. Then, the user has various choices. At decision block 177, the user may choose to generate test case data. In that case, the system formats the temporary storage information for the target system, at block 179. Additionally, as indicated at decision block 181, the user may choose to generate test case billing verification data. In that case, the system formats the temporary storage information for the target system billing verification data, at block 183. Finally, as indicated at decision block 185, the user may choose to generate outpulsed digit verification data. In that case, the system formats the temporary storage information for the target system outpulsed digit verification data, at block 187.

Figure 12:
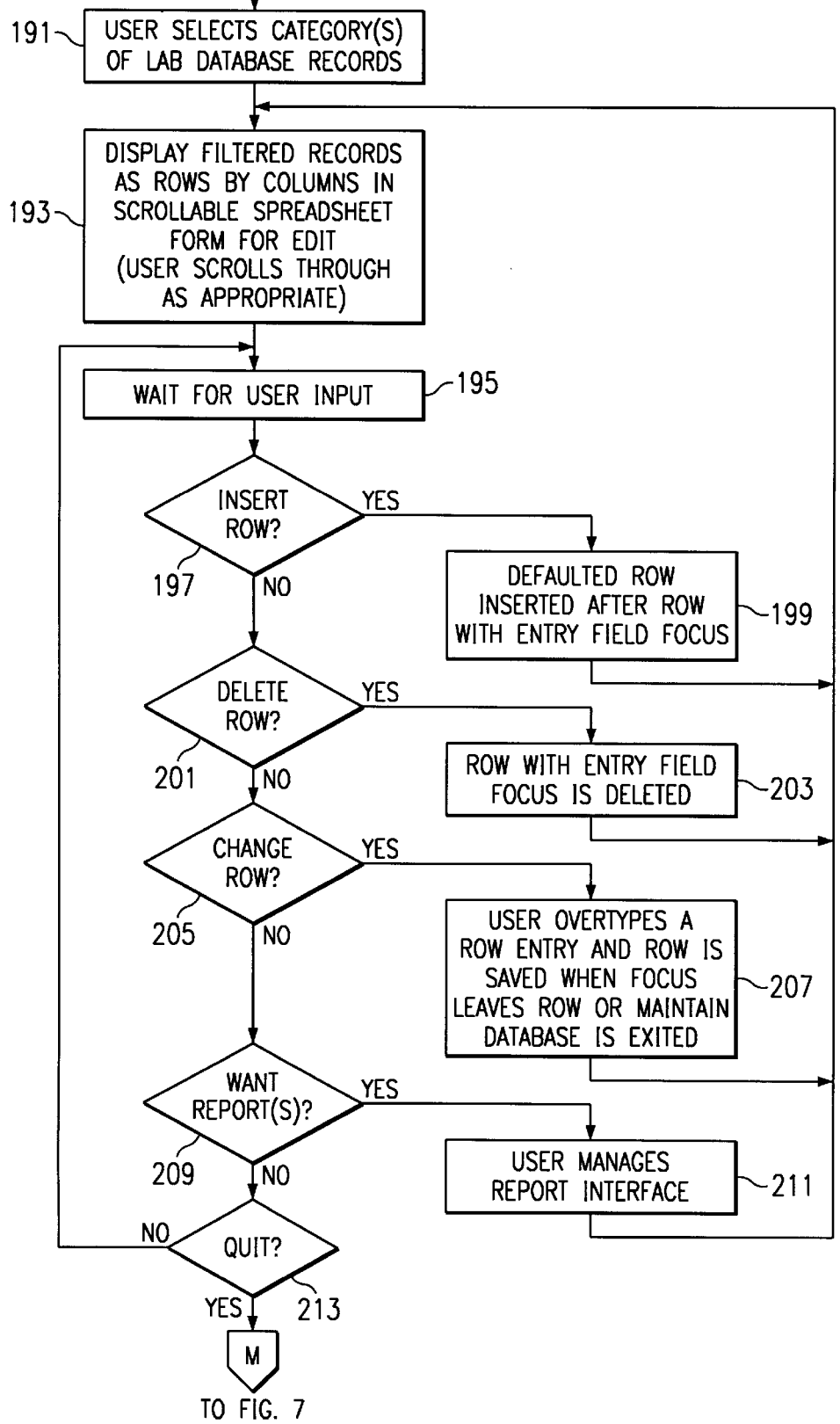
FIG. 12 is a flowchart of the maintain lab database routine of the present invention.

Referring again to FIG. 7, if the user selects the maintain lab database mode, at decision block 189, the system displays the action list of FIG. 5 at block 190, and branches to the logic of the flow chart of FIG. 12. The user in this case has expertise in the lab database, and may or may not be a test case author. Referring to FIG. 12, the user selects a category of lab database records to be maintained, at block 191. The system then displays filtered records in a spreadsheet format, at block 193, and waits for user input, at block 195. The user can manage the spreadsheet by inserting a row, at decision block 197 and process block 199, or by deleting a row, at decision block 201 and process block 203. If the user desires to change the data in the lab database, as indicated at decision block 205, the user types the new data into a row and the system saves the typed new data when the user changes focus from the row or exits the spreadsheet, as indicated at block 207. The user may request a report, at decision block 209, and manage a report interface, at block 211. As indicated at decision block 213, the user stays in the maintain lab database spreadsheet until he or she quits, whereupon the system returns to block 87 of FIG. 7 to await further user input.

Figure 13:
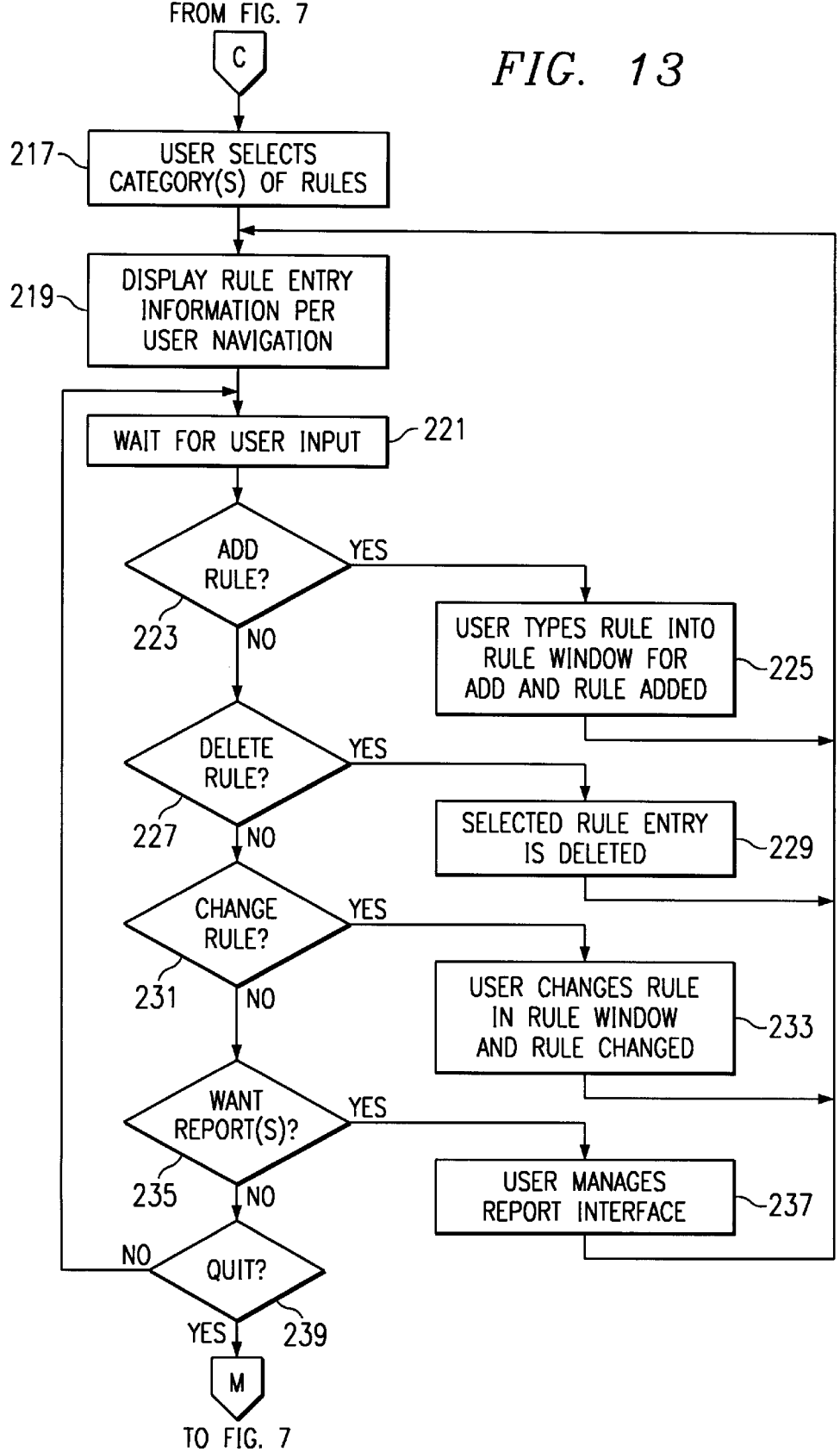
FIG. 13 is a flowchart of the maintain rules routine of the present invention.

Referring again to FIG. 7, if the user selects the maintain rules mode, at decision block 215, the system displays the action list of FIG. 6 at block 216, and branches to the logic of the flow chart of FIG. 13. The user in this case has expertise in rules and expert systems, and may or may not be a test case author. Referring to FIG. 13, the user selects categories of rules with which to work, at block 217. In response to user selection, the system displays rule entry information, at block 219, and waits for user input at block 221. If the user desires to add a rule, at decision block 223, the user enters the new rule into a rule window, at block 225. If the user desires to delete a rule, at decision block 227, the user selects the rule for deletion, at block 229. If the user desires to change a rule, at decision block 231, the user changes the rule in the rule window, at block 233. The user may request a report, at decision block 235, and manage the report interface, at block 237. As indicated at decision block 239, the user stays in the maintain rules mode until he or she quits, whereupon the system returns to the main menu, at block 87 of FIG. 7, to await further user input.

Referring again to FIG. 7, the user stays in the main menu, or in an action screen invoked from the main menu, until he or she exits, at decision block 241, by actuating exit push button 52 of FIG. 2. As can be seen from the foregoing, the system of the present invention allows a team of people with various areas and levels of skill and expertise to produce telecommunication system test cases. People with expertise in the lab database and people with expertise in rules based expert systems can maintain their respective databases while test case authors with possibly limited knowledge of the lab environment or test execution or verification platforms can write test cases.

What is claimed is:

1. A method of creating telecommunication system test cases, which comprises the computer implemented steps of:

eliciting test case information from a test case author;

searching a database of laboratory data for a best match to test case information elicited from said test case author; and, completing a test case outline, based on said best match, with data from said database of laboratory data.

2. The method as claimed in claim 1, including the computer implemented step of saving test case information elicited from said test case author to a test case storage database as a partially completed test case outline.

3. The method as claimed in claim 2, wherein said step of searching said database of laboratory data for a best match to test case information elicited from said test case author includes the computer implemented steps of:

fetching said partially completed test case outline from said test case storage; and, searching said database of laboratory information for a best match to said partially completed test case outline.

4. The method as claimed in claim 3, including the computer implemented step of:

replacing said partially completed test case outline with said completed test case outline in said test case storage.

5. The method as claimed in claim 1, including the computer implemented step of:

applying rules to said completed test case outline to generate output data for a test case.

6. The method as claimed in claim 5, including the computer implemented step of:

storing said output data to an output storage database.

7. The method as claimed in claim 5, including the computer implemented step of:

producing a test case output based on said output data.

8. The method as claimed in claim 1, wherein said step of eliciting test case information from a test case author includes the computer implemented step of:

presenting to said test case author at least one test case design screen, said test case design screen including a plurality of fields for eliciting test case information.

9. The method as claimed in claim 8, including the computer implemented steps of:

presenting to said test case author at least one test case design screen with fields for a selected test case outline filled in; and, storing a modified test case outline based on changes made by said test case author to fields of said at least one test case design screen.

10. The method as claimed in claim 9, wherein said step of storing said modified test case outline includes the computer implemented step of replacing said selected test case outline with said modified test case outline.

11. The method as claimed in claim 9, wherein said step of storing said modified test case outline includes the computer implemented step of storing said modified test case outline as a new test case outline.

12. A method of creating telecommunication system test cases, which comprises the computer implemented steps of:

storing a partially completed test case outline, said partially completed test case outline including data in certain ones of a plurality of fields;

forming a completed test case outline with data from a database of laboratory data; and, replacing said partially completed test case outline with said completed test case outline.

13. The method as claimed in claim 12, wherein said step of forming a completed test case outline includes the computer implemented step of:

searching a database of laboratory data for a best match to said data in said certain ones of said plurality of fields.

14. The method as claimed in claim 12, including the computer implemented steps of:

presenting to a test case author at least one test case design screen with fields for a selected test case outline filled in;

saving a modified test case outline made by said test case author.

15. The method as claimed in claim 12, including the computer implemented step of:

applying rules to said completed test case outline to generate output data for a test case.

16. The method as claimed in claim 15, including the computer implemented step of:

storing said output data to an output storage database.

17. The method as claimed in claim 16, including the computer implemented step of:

producing a test case output based on said output data.

18. A system for creating telecommunication system test cases, which comprises:

a first user interface for the input of test case information for the creation of at least partially complete test case outlines;

a test case outline storage for storing test case outlines;

a database of laboratory data;

means for searching said database of laboratory data and creating completed test case outlines from said at least partially completed test case outlines;

a database of rules for generating test case output data from test case outlines; and, means for applying rules from said database of rules to test case outlines stored in said test case storage to generate test case output data.

19. The system as claimed in claim 18, including:

a second user interface for input of information to said database of laboratory data.

20. The system as claimed in claim 18, including:

a third user interface for input of information to said database of rules.

21. The system as claimed in claim 18, including temporary output storage for storing test case output data.

22. The system as claimed in claim 21, including output handlers for generating platform specific files from test case output data stored in said temporary output storage.

* * * * *